United States Patent [19]

Kim

[11] Patent Number: 4,664,808
[45] Date of Patent: May 12, 1987

[54] METHOD FOR CONTINUOUS SEPARATION OF DISSOLVED MATERIALS

[75] Inventor: Bang M. Kim, Schenectady, N.Y.

[73] Assignee: General Electric Company, Schenectady, N.Y.

[21] Appl. No.: 644,480

[22] Filed: Aug. 24, 1984

Related U.S. Application Data

[63] Continuation-in-part of Ser. No. 407,963, Aug. 13, 1982, Pat. No. 4,563,337.

[51] Int. Cl.$^4$ .............................................. B01D 13/00
[52] U.S. Cl. ..................................... 210/638; 210/648
[58] Field of Search ............... 210/641, 648, 805, 806, 210/638

[56] References Cited

U.S. PATENT DOCUMENTS

| | | | |
|---|---|---|---|
| 3,827,975 | 8/1974 | Bizot et al. | 210/647 X |
| 3,839,200 | 10/1974 | Gigou et al. | 210/648 X |
| 3,956,112 | 5/1976 | Lee et al. | 210/22 C |
| 3,957,504 | 5/1976 | Ho et al. | 210/638 |
| 4,051,230 | 9/1977 | Miyauchi | 423/54 X |
| 4,306,946 | 12/1981 | Kim | 204/51 |
| 4,443,414 | 4/1984 | Kim | 423/54 |
| 4,563,337 | 1/1986 | Kim | 210/638 |

OTHER PUBLICATIONS

Porter, M. C. et al, "Membrane Ultrafiltration", Chem. Tech., Jan. 1971, pp. 56–63.
Baker, R. W. et al, "Coupled Transport Membranes", Jorn. Memb. Science, 2 (1977), 213–233.
Skovronek, H. S. et al, Advanced Treatment Approaches for Metal Finishing Wastewaters (Part II), *Plating and Surface Finishing*, Nov. 1977, pp. 24, 26, 28, 30 and 31.

*Primary Examiner*—David Sadowski
*Attorney, Agent, or Firm*—Lawrence D. Cutter; James C. Davis, Jr.; Marvin Snyder

[57] ABSTRACT

A method of continuous separation of dissolved materials employs two membranes, each disposed in its own fluid-tight chamber. An aqueous feed solution containing organic material is passed in contact with a recirculating flow of organic extractant which receives selected dissolved organic material. The extractant is then passed over a second membrane, the other side of which is supplied with a stripping solution for further selective recovery of the desired material. During recirculation the organic extractant is passed through an aqueous separator. However, extractant treatment for organics removal therefrom may also include methods other than the use of a second membrane and a stripping solution.

12 Claims, 6 Drawing Figures

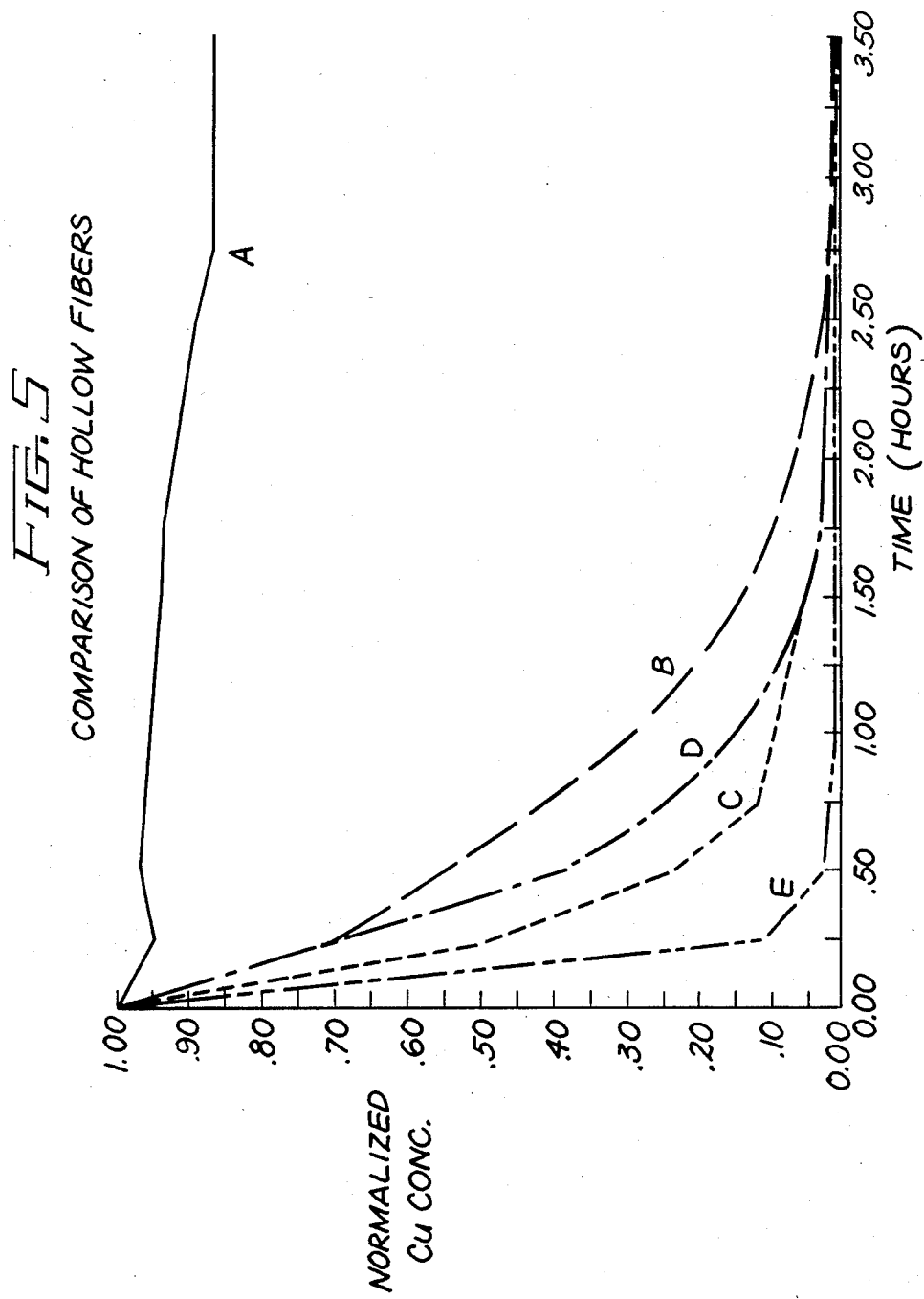

METHOD FOR CONTINUOUS SEPARATION OF DISSOLVED MATERIALS

BACKGROUND OF THE INVENTION

The present application is a continuation-in-part of application Ser. No. 407,963 filed Aug. 13, 1982 now U.S. Pat. No. 4,563,337.

The present invention relates to methods and apparatus for the treatment of metal-containing solutions and solutions containing dissolved organics. More particularly, the present invention relates to a continuous separation method which is particularly useful for the selective concentration and removal of metals and organics from aqueous solutions, either for pollution control, resource recovery or chemicals separation purposes.

In various hydrometallurgical processes, aqueous solutions containing large amounts of dissolved metal ions such as gold, silver, uranium, cobalt, molybdenum and copper are processed. Additionally, in various plating operations, aqueous solutions containing relatively high concentrations of silver, cadmium, zinc, chromium, and copper are discharged. Such aqueous solutions can be pollutants because of the relatively high levels of metal ions present. However, many of these metals are valuable in their own right and selective recovery of them from the aqueous solutions is usually highly desirable.

In various other processes, it is desirable to separate organic materials from aqueous solutions or organic liquids. For example, separation of aromatics, phenols, caprolactam, acetic acid, penicillin and caffeine from aqueous solutions or organic liquid has been seen to be desirable in various petrochemical, plastics, pharmaceutical and food industries.

In U.S. Pat. No. 4,306,946, issued Dec. 22, 1981 in the name of the instant inventor, Donnan dialysis is employed as a continuous ion exchange process. This process employs a solid ion exchange membrane as a barrier between feed and eluant solutions. However, the method suffers from low removal rate which is determined by the diffusion rate of ions through the solid, ion-exchange membrane. However, it is nonetheless a continuous method and provides many advantages over conventional batch processes which require complex flow schemes and, consequently, high equipment cost.

Another form of metal recovery process is described in the article "Coupled Transport Membranes" by R. W. Baker, et al. in the *Journal of Membrane Science*, Vol. 2, pages 213-233, 1977. The process described therein employs a porous membrane which is impregnated with an organic absorbing medium. However, this process exhibits certain short-comings, particularly membrane instability. Membrane extraction performance deteriorates significantly due to the loss of the organic medium and also due to the filling of the pores with the aqueous solution. This happens when the organic medium is leached out of the pores or pushed out of the pores due to the pressure imbalance across the membrane. The present invention is distinct from the method described in this paper chiefly in that the absorbing medium is not impregnated in a membrane but rather is disposed in a recirculating system between separate membranes in distinct fluid-tight chambers. Accordingly, the problem of the loss of ion exchange material is not present.

Additionally, a process for hydrometallurgical extraction is described in U.S. Pat. No. 3,957,504, issued May 18, 1976 to Ho et al. FIG. 4 of the patent to Ho et al. is particularly relevant in that it illustrates a hydrometallurgical extraction process flow diagram in which a chelating fluid is recycled back to a first ionic membrane extraction unit. However, no provision is made for the use of an aqueous/organic separator which the present inventor has found to be particularly effective in selectively isolating and enriching desired metallic and organic species using porous membranes. Moreover, Ho et al. emphasize the utilization of dense, ionic membranes for their separation process. In their process, the chelating takes place at the interface between the dense membrane and one of two liquid phases. This is to be distinguished from the utilization of large pore size barriers, as preferred herein, since in these barriers aqueous and organic interfaces are created in the pores of the barrier. The large pore size barriers have advantages of high removal rate, less expensive and usually higher chemical stability and mechanical strength. Large pore sizes, however, are associated with leakage of the aqueous solution into the organic phase. The problem associated with this leakage is solved by using aqueous/organic separation described in this invention.

In U.S. Pat. No. 3,956,112 issued to Lee et al., there is disclosed a membrane solvent extraction process for the removal of organics from liquids. They describe the use of non-porous membranes to separate two liquid phases. The rate of removal, which is determined by the rate of diffusion through the non-porous membrane, is slow. They do not consider the problems associated with the leakage of aqueous solutions or organics through membranes and no provision is made for aqueous/organic separator.

SUMMARY OF THE INVENTION

Most generally, with respect to the present invention, liquid A, containing material to be removed, is separated from liquid B, an organic extractant, by a porous barrier. Liquid A is an aqueous solution or organic liquid. Liquid A may contain ions, inorganics or organics. Because of large pore size, liquid A/liquid B interface is created within the pores of the barrier. A large contact area is particularly achieved through the use of hollow fiber membranes. Liquid B is preferably regenerated by contacting it with another liquid C, a stripping liquid, by means of another porous barrier. In a continuous flow system the process employs two modules, one for extraction and one for regeneration. However, the regeneration of liquid C is possible by other separation processes such as distillation, conventional solvent extraction processes, etc. More importantly for the present invention, the aqueous liquid A accumulated in circulating liquid B is removed thus mitigating any deleterious effects occurring as a result of transport of liquid A across the barrier into liquid B.

In accordance with a preferred embodiment of the present invention, a method for a continuous separation process for waste water treatment and metal recovery is disclosed in which a feed solution and organic extractant are separated by a porous barrier. The organic extractant absorbs ions from the feed solution by reaction of liquid A and liquid B at the interface created in the pores of the membrane. Furthermore, the organic extractant is processed through an aqueous organic separator to enhance the enrichment ratio and to increase the removal rate.

In one embodiment of the present invention, a method for continuous mineral recovery from the feed solution comprises the steps of contacting the feed solution with a first porous membrane; contacting a organic extractant with the other side of this porous membrane, and also with a second porous membrane, the other side of which is in contact with a flowing stripping solution. The organic extractant is circulated between the two porous membranes and in the process of so doing, is passed through an aqueous organic separator.

In another embodiment of the present invention, an apparatus for continuous mineral recovery from a feed solution comprises first, open-loop means for contacting the feed solution with a first side of a first porous membrane; a second, closed-loop means for circulating an organic extractant in a continuous loop in contact with the second side of a first porous membrane and also in contact with the first side of a second porous membrane, the organic extractor being passed through an aqueous organic separator; and third, open-loop means for contacting an stripping solution with the second side of the second porous membrane for the selective extraction of at least one dissolved metal from the organic extractant.

An apparatus for continuous materials recovery from the feed solution, in accordance with the present invention, may also comprise a first, fluid-tight chamber having a first porous membrane disposed therein so as to define first and second volumes; a second, fluid-tight chamber having a second porous membrane disposed therein so as to define a third and fourth volume; means for providing fluid flow to the third volume from the second volume; means for providing fluid flow from the third volume to the second volume through an aqueous organic separator; means for providing fluid flow for the feed solution through the first column in contact with the first porous membrane; and, lastly, means for providing fluid flow of an stripping solution through the fourth volume in contact with the second porous membrane.

Accordingly, it is an object of the present invention to provide a method and apparatus for continuous materials recovery for the purpose of removal of dissolved metal species from a feed solution.

It is also an object of the present invention to remove specific organic material from organic liquid by means of a continuous separation process.

It is a further object of the present invention to provide an aqueous/organic separator for use in continuous materials separation processes for the purpose of enhancing recovery rates and efficiencies.

It is yet another object of the present invention to overcome problems associated with the use of porous, and especially large pore, membranes through the use of an aqueous separator.

Lastly, but not limited hereto, it is an object of the present invention to provide a simple and effective membrane extraction process for material separation or recovery.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may be best understood by reference to the following description taken in connection with the accompanying drawings in which:

FIG. 5 is a set of graphs indicating normalized copper concentration as a function of time for five different membrane materials.

DETAILED DESCRIPTION OF THE INVENTION

The process utilizes separation of two immiscible liquids A and B by means of porous membranes. The dissolved material in liquid A is removed by reaction of liquid A and B in the pores of the porous membrane. However, when two liquid phases are separated by large pore size barriers, there is a tendency of transport of a small amount of aqueous liquid A to liquid B. Several potential mechanisms are postulated for this phenomenon. If there is an imbalance of pressure or mechanical forces between two phases, bulk movement of liquid occurs. The transfer rate of liquid is effected by the properties and the pore size of the barrier, the characteristics of the liquids and the pressure differences. Accumulation of liquid A in liquid B may be caused by diffusion of liquid A into liquid B which has been saturated with liquid A. It is also thought that spontaneous emulsification occurs in the pores when surface forces are not balanced or at solid/liquid phase interfaces. This eventually causes cross-over of two liquids through the porous barrier. Unfortunately, transport of liquids across the porous barrier significantly deteriorates the performance of the separation process. The presence of liquid A in liquid B reduces the efficiency of the regeneration operation. Likewise, the leakage of a stripping solution C across another porous barrier into liquid B also deleteriously affects the extraction chemistry. In a continuous flow system where extraction and stripping modules are used together, the problem becomes even more significant. Even a small amount of liquid A or liquid C in the liquid B extraction loop causes the transport of liquid C to liquid A and the transport of liquid A to liquid C. This results in a shift in the equilibrium relationship in extraction and stripping processes and reduces the removal efficiency and the separation factor. However, these problems are solved in the present invention through the use of an aqueous/organic separator in a process more particularly described below.

Figure 1:
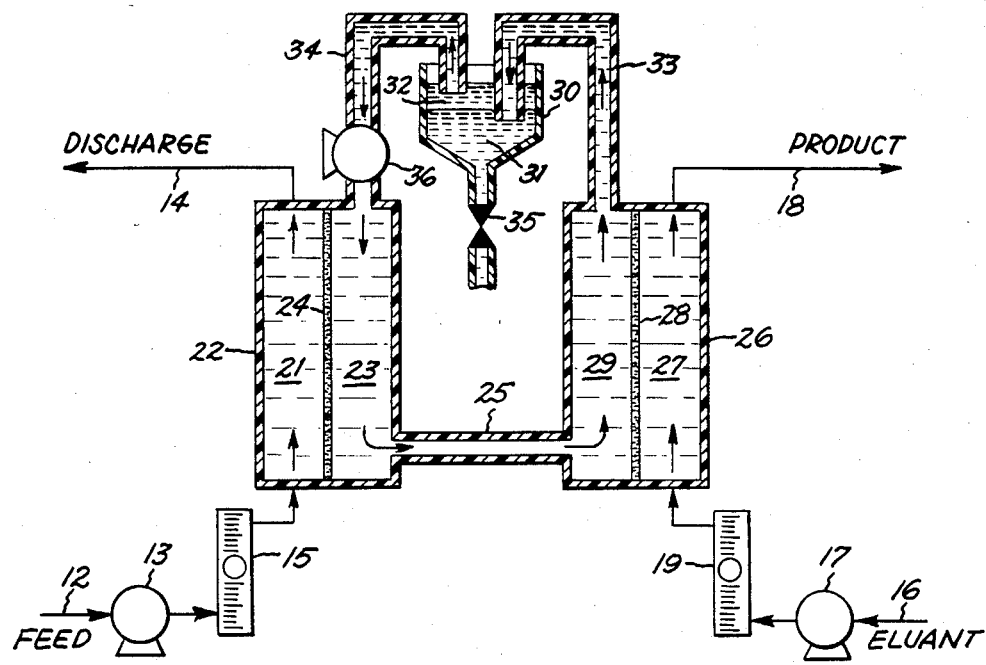
FIG. 1 is a partial cross-sectional side elevation and schematic view illustrating an embodiment of the present invention.

The apparatus shown in FIG. 1 illustrates an embodiment for carrying out the method of the present invention. In particular, there is shown first fluid-tight chamber 22 having membrane 24 disposed therein so as to divide the chamber into volumes 21 and 23, as shown. Chamber 22 is preferably constructed using a nonreactive material such as plastic or a plastic-line metal container. Feed solution 12 containing dissolved metal species such as copper, gold, silver, chromium, and uraparticulate content in the feed solution for proper operation. However, the continuous extraction system of the present invention has been shown to be operable even when feed solutions containing particulate contamination are employed. Furthermore, the continuous ion exchange system of the present invention permits a wide choice of organic solvents to be used as liquid ion exchange solution constituents.

With respect to membranes 24 and 28, it is desirable that the pore sizes and the properties of the membranes be chosen so that high molecular weight liquid ion exchanger molecules are not permeable through it, but that the desired ions are so permeable. The membrane may also be selected to particularly function to separate aqueous and organic phases. Chemically stable and mechanically strong polymeric membranes with pore size in the range of $0.005\mu$ to $1\mu$ may be employed. The membrane may be a flat sheet spiral wound or may comprise a hollow fiber type of membrane. However, the hollow fiber type of membrane is preferred since it exhibits a large contact surface area. The organic extractant absorbs ions from the feed solution by reaction in the pores of the membrane and is continuously fed to another contactor in a second chamber. Stripping solutions such as acids, bases and salt solutions desorb ions from the organic extractant material and concentrate them in the product stream.

For the recovery of anions such as chromate ions, anion exchange materials such as secondary amines, tertiary amines and quaternary amines may be employed. In such a case, sodium hydroxide or sodium chloride may be used as eluant solutions. For recovery of cations such as copper, hydroxyoximes or oxime derivatives may be used. In this case, acids such as $H_2SO_4$, $HNO_3$ and CHl may be used as eluant solutions.

Table 1 below further indicates the effectiveness of the methods and apparatus of the present invention. In particular, the experiment illustrated therein involved copper enrichment using LIX 64N ™ as a liquid ion exchanger. The stripping solution comprised a 2 Molar solution of sulfuric acid and the membrane or contactor comprised a 3.6 m² hollow fiber membrane. The flow rates are indicated in milliliters per minute and the third column indicates the ratio of the flow rates for the feed solution and the eluant solution. The concentrations of copper are indicated in columns 4 and 5 in units of grams per liter. The ratio of the concentration is indicated in column 6. In particular, column 6 indicates the concentration ratio between the product solution and the feed solution. The results indicated Table 1 clearly indicate the ability of the present system to remove copper from the feed solution and to concentrate copper in the product solution.

TABLE 1

COPPER ENRICHMENT

| FLOW | | | CONCENTRATION | | |
|---|---|---|---|---|---|
| Feed (ml/min) | ELUANT (ml/min) | FEED ELUANT | FEED (g/l) | PROD. (g/l) | PROD. FEED |
| 40 | 2 | 20 | 0.61 | 12.2 | 20 |
| 80 | 4 | 20 | 0.59 | 11.1 | 18.5 |
| 80 | 2 | 40 | 0.62 | 23.5* | 38.9 |

*COPPER TRANSFER RATE: 2.8 g/hr

Although the system has been described for removal of metal anions, the principle works with any inorganic or organic ion species. Some examples of non-metallic ions are $SO_4^{--}$, $S^{--}$, $PO_4^{---}$, $Cl^-$ and $NO_3^-$.

Figure 4A:
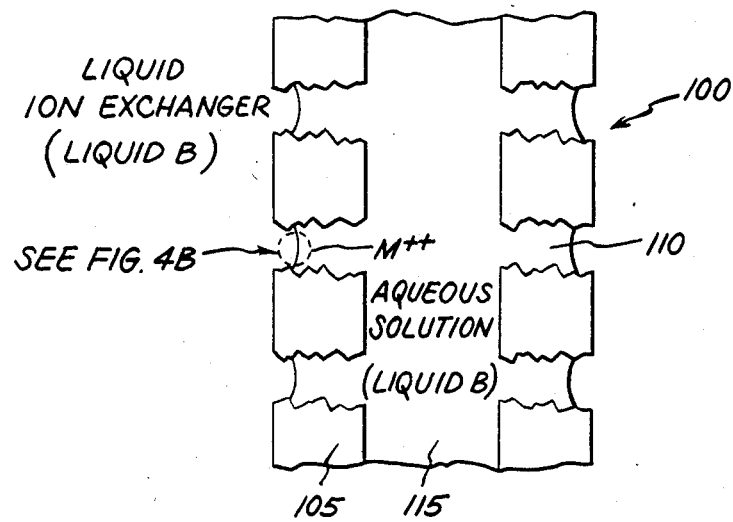
FIG. 4A is a schematic diagram illustrating the functioning of porous, hollow fiber membranes in processes in accordance with the present invention.
Figure 4B:
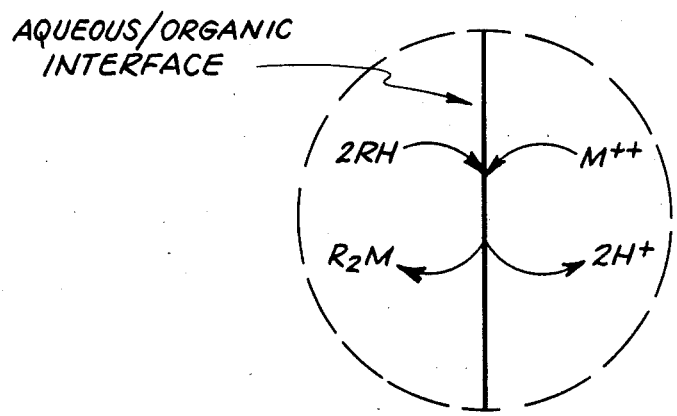
FIG. 4B is an enlarged view of a portion of the interface shown in FIG. 4A.

In order to more completely describe the processes occurring in the extraction process of the present method, attention is now directed to FIGS. 4A and 4B. FIG. 4A illustrates in schematic fashion a section of hollow fiber membrane 100 which includes wall 105 and central bore 115. The hollow fiber includes a large plurality of microscopic pores 110 in which the desired transport reactions occur. In particular, it is seen that aqueous solution (liquid A) fills bore 115 and forms an aqueous/organic interface with liquid ion exchange material at an interface within the pore. It is the presence of these relatively large pores (0.005 microns to 1 micron) together with their relatively large number which permits a practical transport flux between liquid A and liquid B. The reactions occurring at the aqueous/organic interface are more particularly shown in FIG. 4B which is an enlarged view of a small section along the interface. The reaction can be described as follows:

$$2RH + M^{++} \rightarrow R_2M + 2H^+.$$

In short, the transport reactions occurring in the processes of the present invention occur at aqueous/organic interfaces found within the pores of the barrier.

As a further indication of the power and flexibility of the processes disclosed herein, attention is now directed to FIG. 5 in which the normalized copper concentration in a recirculating feed solution is plotted as a function of time for various hollow fiber membrane materials. The letter references A through E in FIG. 5 refer to the various hollow fiber membrane materials listed in Table 2 below:

TABLE 2

HOLLOW FIBERS EVALUATED

| Pore Item | Material | Bore Dia. ($\mu$) | Molecular Weight Cutoff | Dia. ($\mu$) | Wall Thickness ($\mu$) | Area (cm²) |
|---|---|---|---|---|---|---|
| A | Polyamide | 600 | 2,000 | — | 150–300 | 520 |
| B | Fluoropolymer | 700 | 10,000 | — | 400 | 520 |
| C | Polysulfone | 1,100 | 2,000 | — | 200 | 280 |
| D | Polypropylene | 240 | 100,000 | 0.05 | 25–30 | 695 |
| E | Polypropylene | 240 | 75,000 | 0.03 | 25–30 | 372 |

It is to be noted in Table 2 above that the pore size is expressed by MWCO (molecular weight cutoff) and by the pore diameter. It is also seen that for the removal of copper from the feed solution hollow fiber E performed better than the other four materials and accordingly, is preferred for this type of separation.

In order to provide an indication of the problem of aqueous transfer, Table 3 below is provided. Table 3 is itself divided into two parts: Part A and Part B. Part A describes the aqueous and solvent transfer rates in single membrane modules and Part B indicates the same transnium ions is supplied to volume 21 of chamber 22 by means of pump 13. The rate of solution flow is measured using flow meter 15. Feed solution 12 is passed over and in contact with membrane 24 (described in detail below) and exits volume 21 as discharge 14 which is either treated as waste or as an aqueous solution for further processing, depending upon the metal compositions in feed solution 12. An organic extractant is simultaneously circulated through volume 23 which is disposed on the other side of membrane 24 from volume 21 of chamber 22. The organic extractant is circulated in a closed loop by means of pump 36. The organic extractant is selected to absorb the desired product species through porous membrane 24 by means of a counterbalancing flow of ions such as $H^+$ to discharge solution 14. The organic extractant containing the desired dissolved metal species is circulated through volume 29 in chamber 36 (constructed similarly to chamber 22) so that the solution flows over and in contact with second porous membrane 28. Volume 27, on the other side of porous membrane 28 opposite volume 29, contains a circulating flow of stripping solution such as acid, base or salt solution for the desorption of the desired metal specie or species through porous membrane 28. The stripping solution 16 is supplied by pump 17 to volume 27 and its rate of flow is measured by flow meter 19. The desired product solution 18 is thus removed from volume 27.

A significant feature of the present invention is the recirculation of organic extractant from volume 29 back to volume 23 through conduits 33 and 34. It is further significant that an aqueous organic separator is employed in this closed loop. In particular, it has been found by the present inventor that there is a tendency for water to be present in the organic extractant to the detriment of the proper operation of the process. There are many causes for the presence of this aqueous solution in the organic liquid ion exchange medium. Aqueous solutions tend to move to the organic phase because of the pressure difference across the membrane. Water droplets also tend to form in the organic phase by saturation of dissolved water. Water may also be formed in the organic phase by the reaction of absorbed $H^+$ and $OH^-$ the stripping solution and feed solutions. Even a small amount of aqueous solution trapped in the organic phase (in this case, in the liquid ion exchange material) significantly deteriorates the performance of the ion exchange system. Accordingly, it has been found, as the graphs in FIGS. 2 and 3 indicate, that the presence of the aqueous/organic separator improves the enrichment factor as well as the rate of metal removal. The aqueous organic separator may comprise a simple settling container 30 in which the denser aqueous component 31 settles to the bottom of the container and is periodically or continuously removed through valve 35. Accordingly, conduit 34 is disposed within container 30 so as to preferentially remove only the de-aquified portion 32 of the contents of container 30.

The aqueous/organic separator and pump 36 may also be located in the position in the flow circuit occupied by conduit 25. If very high enrichment factor is required, two distinct separator units may be employed, one located as shown in FIG. 1 and the second located in the position in the flow circuit occupied by conduit 25.

Figure 2:
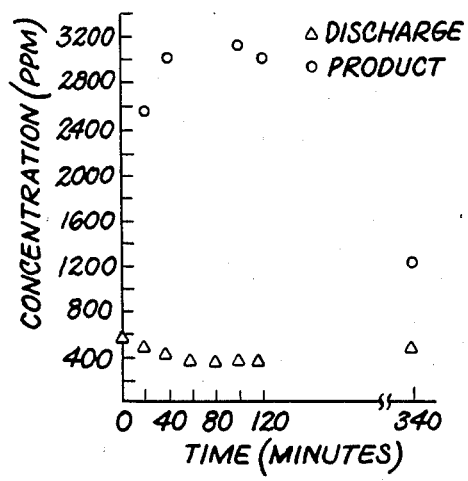
FIG. 2 is a plot of concentration of copper in a treated solution and in the product solution as a function of time without the use of an aqueous/organic separator.

FIG. 2 illustrates the result of experiments conducted using an apparatus similar to that shown in FIG. 1 except that conduits 33 and 34 were connected directly so as not to provide any aqueous extraction from the liquid ion exchange fluid which is recirculated from volume 29 to volume 23. The experiment involved treating 2,000 ml of 0.01 Molar $CuSO_4$ solution by passing it through the membrane extractor. The discharge solution was recycled to the feed container. The stripping solution comprised 200 ml of 2 Molar $H_2SO_4$ solution. The product stream was also recycled to the eluant container. The liquid ion exchange material comprised commercially-available LIX 64N TM (hydroxyoximes) diluted in kerosene. In ideal operation where there is no bulk transport of aqueous solution across the membrane, the copper concentration in the feed container should continuously decrease and reach zero concentration. The copper concentration in the product container should reach a concentration of 0.1 Molar (6,400 ppm), which is 10 times the feed concentration. However, the copper concentration in the feed container began to increase after 60 minutes of operation. The copper concentration in the product stream increased initially but decreased after 60 minutes. It has been determined by the present inventor that this incapability of enrichment/removal is attributable to the increased aqueous content (of the liquid ion exchange material) which carries ions across both membranes 24 and 28 without the desired exchange of metal ions. The aqueous portion of the circulating medium is responsible for the transport of $H^+$ ions from the stripping solution to the feed solution so as to change the equilibrium condition for the extraction reaction and to reduce the loading of metal ions in the liquid ion exchanger.

Figure 3:
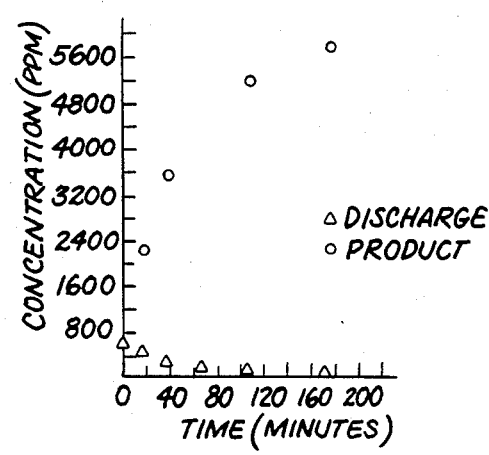
FIG. 3 is a plot similar to FIG. 2 except that an aqueous/organic separator is employed.

FIG. 3 illustrates the result of an experiment similar to the experiment whose results are illustrated in FIG. 2, except that an aqueous/organic separator was employed in the recirculating loop from volume 29 to volume 23. The presence of this additional apparatus resulted in remarkably improved results. This is clearly indicated in FIG. 3 in which it is seen that the concentration of copper ions in the feed container has decreased to a very small value after 180 minutes of processing. It is further seen that the concentration of copper ions in product solution 18 has steadily increased to a level of over 5,600 ppm after 180 minutes of processing. Even after 120 minutes of operation, the concentration of the desired product in solution 18 is significantly greater in the apparatus employing an aqueous-organic separator.

The method and apparatus illustrated in FIG. 1 has been demonstrated to function effectively as a continuous ion separation and enrichment device. For example, copper is selectively removed from solution containing copper and iron species. This illustrates one of the several significant advantages of the present invention, namely, the ability to employ in a simple compact device a large variety of organic extractants each of which may exhibit high selectivity to a specific metal. Such materials are well known to those skilled in the art and are exemplified in the aforementioned patent to Ho et al. Such advantages are not found in conventional methods of metal extraction which typically employ solvent extraction in conjunction with a mixer/settler type of operation. Such conventional systems must employ complicated, multi-stage operations to achieve a high enrichment factor. However, the instant apparatus has demonstrated efficiencies in a single contactor (that is, passage of solution through a single column) which are comparable to those previously obtained only through multi-stage enrichment processes. Moreover, conventional methods require stringent control of the level of fer rates for a combination of extraction and stripping modules as generally indicated in FIG. 1. In both parts of the table the term shell refers to the contents of the module in contact with the membrane outside of the bore. The pressure difference between the aqueous and the organic side was measured at the inlet and outlet (with respect to aqueous solution) of the membrane module. During operation of polypropylene hollow fiber modules in a combined mode, the rate of water accumulation was 2.25 ml/ft$^2$/hr. when the pressure difference was 36 inches of water at the inlet and 1.8 inches of water at the outlet. The rate of water transport decreased as the pressure difference was reduced. In this series of experiments there was no flow of organics, except when water and kerosene were separated by a polysulfone membrane with a molecular weight cut off (MWCO) of 100,000. The results indicate it is possible to block the organic leakage by applying a slightly higher pressure at aqueous side.

Even further indications of the wide range of materials employable in the process of the present invention are found in Table 4 below. Table 4 provides a list of organic extractants usable for various metal separation processes. These include acid extractants, acid chelating extractants, anion exchangers and solvating extractants. All of these extractants would be deleteriously effected by the presence of an aqueous phase. The primary commercial uses for these various organic extractants is also provided in Table 4.

The present invention is not, however, limited to the extraction of metal species in an aqueous solution. The present invention is also applicable to the extraction of various organic compounds contained in aqueous solutions. These organic compounds include aromatics, phenols, caprolactam, acetic acid, penicillin and caffeine. Table 5 below provides a list of the preferred extractants to be used with these various organic compounds. As in the separation of metallic species, aqueous contamination is a problem and is solved herein by the use of an aqueous organic separation device. While the device illustrated in FIG. 1 is suggestive of settling tank forms of separators, other separation methods are employable. These methods include not only density differences but electrophoretic separation and also membrane separation methods. If the feed is organic liquid an organic/organic phase separator can be employed.

In addition to the membrane materials listed in Table 2 other materials may also be employed. These include polyamineamide, polyhydrazides, polybenzimidazole, polyureas, polytetrafluoroethylene (PTFE) and cellulose acetate. In general, the porous barriers employed in the present invention generally exhibit a pore size of from about 0.005 microns to about 1 micron and a barrier thickness of between about 0.1 microns to about 100 microns with a porosity of at least 10 percent. The membrane materials themselves may be either hydrophillic or hydrophobic and may be disposed in the form of hollow fibers, flat plates or spiral wound modules.

TABLE 3

TRANSPORT OF AQUEOUS SOLUTION AND SOLVENTS THROUGH PORES

A. Single Membrane Module

| Membrane | Bore | Shell | ΔP (cm H$_2$O) | Transfer Rate (ml/m$^2$, min) Aqueous | Solvent |
|---|---|---|---|---|---|
| Polysulfone (MWCO 100,000) | H$_2$O | Kerosene | 10.9 ~ −7.6 | 2.5 | 0 |
|  |  |  | 5.6 ~ −15.2 | 0.72 | 0 |
|  |  |  | 4.6 ~ −18.2 | 0.12 | 0.03 |
| Polypropylene (0.03) | CuSO$_4$ | LIX TM | 91.4 ~ −43.2 | 0.45 | 0 |
| Polypropylene (0.05) | LIX TM | H$_2$SO$_4$ | 86.1 ~ −30.0 | 0 | 0 |

B. Combination of Extraction and Stripping Module

| | Extraction Module | | | | Stripping Module Transfer Rate (ml/m$^2$, min) | | | |
|---|---|---|---|---|---|---|---|---|
| Membrane | Bore | Shell | ΔP (CM H$_2$O) | Membrane | Bore | Shell | ΔP (cm H$_2$O) | Aqueous | Solvent |
| Polypropylene (0.03) | CuSO$_4$ | LIX TM | 9.14 ~ 47.0 | Polypropylene (0.05) | LIX TM | H$_2$SO$_4$ | 78.7 ~ 3.3 | 0.4 | 0 |
| Polypropylene (0.03) | CuSO$_4$ | LIX TM | 58.4 ~ 11.9 | Polypropylene (0.05) | LIX TM | H$_2$SO$_4$ | 78.7 ~ 3.3 | 0.06 | 0 |

TABLE 4

LIST OF ORGANIC EXTRACTANTS FOR REMOVAL OF METALS

| Class | Type | Examples | Commercial Uses |
|---|---|---|---|
| Acid Extractants | Carboxylic acids | Naphthenic acids | Copper-nickel separation |
|  | Alkyl Sulfonic acids | Di-2-ethylhexylphosphoric acid (D2EHPA) | Nickel-cobalt separation |
|  |  | Octylphenylphosphoric acid (OPPA) | Uranium extraction |
|  | Aryl Sulfonic acids | SYNEX 1051* | Magnesium extraction |
| Acid chelating extractants | Hydroxyoximes | LIX63*, LIX64N*, LIX65N*, LIX70* | Copper and nickel extraction |
|  |  | SME 529* | Copper extraction |
|  |  | P5000 series* | Copper extraction |
|  | Oxine derivatives | Kelex 100* | Copper extraction |
|  | β-Diketones | Hostarex DK16* | Copper extraction from ammoniacal solution |
|  |  | LIX64* | Copper extraction from ammoniacal extraction |
|  |  | XI51* | Cobalt extraction from ammoniacal solution |
|  | Alkarysulfonamide | LIX34* | Copper extraction from acidic leach liquors |
|  | Polyols |  | Boron extraction |
| Anion exchangers | Secondary amines | LA-2* | Zinc and uranium extraction |
|  |  | Adogen 283* | Zinc and tungsten extraction |

TABLE 4-continued

LIST OF ORGANIC EXTRACTANTS FOR REMOVAL OF METALS

| Class | Type | Examples | Commercial Uses |
|---|---|---|---|
| | Tertiary amines | Various Alamines*; in particular Alamine 336* | Widely used; cobalt, tungsten, vanadium, uranium extractions, etc. |
| | | Various Adogens*; in particular Adogen 364*, Adogen 381*, Adogen 382* | Cobalt, vanadium, and uranium extractions |
| | Quaternary amines | Aliquat 336* | Vanadium extraction; other possible uses are chromium, tungsten, and uranium extraction |
| | | Adogen 464* | Similar to Aliquat 336 |
| Solvating extractants | Phosphoric, phosphonic, and phosphinic acid esters | Tributyl phosphate (TBP) | Nuclear fuel reprocessing, U O refining, iron extraction, zirconium-hafnium separation, niobium-tantalum separation, rare earth separations, acid extraction |
| | | Trioctylphosphine oxide (TOPO) | Recovery of uranium from wet process phosphoric acid liquors (with D2EHPA) |
| | Various alcohols, ethers, ketones | Butanol-pentanol | Phosphoric acid extraction |
| | | Diisopropyl ether | Phosphoric acid extraction |
| | | Methyl isobutyl ketone (MIBK) | Niobium-tantalum separation, zirconium-hafnium separation |
| | Alkyl sulfides | Di-n-hexyl sulfide | Palladium extraction |

*Please note that each of the above are Trademarks.

TABLE 5

EXTRACTANTS FOR ORGANICS

| Organics | Extractants |
|---|---|
| Aromatics | Polyethylene glycol-water mixtures |
| | Sulfolane |
| | N—Methyl pyrrolidone |
| | N—Formylmorpholine |
| | Dimethyl sulfoxide |
| | Tetraethylene glycol |
| Phenols | Isopropylether |
| | Tricresylophosphate |
| | Methylisobutyl ketone |
| | Butylacetate |
| | Methylene chloride |
| Caprolactam | Chloroform |
| | Toluene |
| | Benzene |
| | Tetrachloroethane |
| | Alkyl phenols |
| | Methylcyclohexane |
| | Dichloroethane |
| | Trichloroethylene |
| | Nitrobenzene |
| Acetic Acid | Tributyl phosphate |
| | Tertiary amines |
| | Trioctyl phosphine oxide |
| Penicillin | Methylcyclohexanone |
| | Diethyl cyclohexanone |
| | Amylacetate |
| | Chloroform |
| Caffeine | Trichloroethylene |

In addition, while the regeneration process of the present invention is generally carried out in a stripping module as described above, it is also possible to employ distillation and solvent extraction methods on the organic extractant to restore it to its desirable functioning state. In order to prevent organic leakage to an aqueous membrane side, it is desirable that a pressure be applied on the aqueous side. Although this might result in some formation of an aqueous constituent in the organic phase, this is preferable to producing the formation of organic constituents in an aqueous phase. A small amount of aqueous solution can be removed by the aqueous/organic separator. The leakage of organic extracants into aqueous feed solutions increases the cost of the chemicals and leads to contamination of the treated solution (raffinate). This is especially important in wastewater treatment.

From the above, it should be appreciated that the methods and apparatus of the present invention provide an improved system for the concentration of organics, metals and other inorganics from hydrometallurgical and various other water treatment operations. It is further seen that the aqueous/organic separator of the present invention provides improved separation capabilities in an effective and economical fashion without deleteriously effecting any other system performance variables. It is further seen that the present invention is applicable to the extraction and concentration of such metal values as gold, silver, uranium, copper, chromium, molybdenum, cobalt, and tungsten, to name but a few.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for continuous separation of selected organic material from a feed solution, said method comprising the steps of:
   contacting said feed solution, said feed solution having at least one selected organic material dissolved therein, with a first porous membrane disposed in means defining a first chamber, said first membrane having a first side and a second side, said feed solution contacting said first side of said first membrane;
   contacting the second side of said first porous membrane in said means defining a first chameber with a liquid organic extractant, for selective extraction of said at least one selected organic material from said feed solution;
   passing said organic extractant that has been in contact with said second side of said first membrane in said means defining a first chamber, so as to contact a second membrane disposed in means defining a second chamber, said second membrane having a first side and a second side, said organic extractant contacting said first side of said second membrane;

passing the organic extractant that has been in contact with the first side of said second membrane through a phase separator for separation of an aqueous component contaminant phase from an organic extractant phase;

recirculating said organic extractant from said separator so as to recontact the second side of said first membrane in said means defining a first chamber; and passing a stripping solution in contact with the second side of said second porous membrane for selective extraction of at least one organic material dissolved in said organic extractant.

2. The method of claim 1 in which at least one of said first and second porous membranes comprises material selected from the group consisting of Polyamide, fluoropolymer, polysulfone, polypropylene, polyamineamide, polyhydrazides, polybenzimidazole, polyureas, polytetrafluoroethylene (PTFE) and celluose acetate.

3. The method of claim 1 in which said organic material is selected from the group consisting of aromatics, phenols, caprolactam, acetic acid, penicillin and caffeine.

4. The method of claim 1 in which said organic material is an aromatic and said organic extractant is selected from the group consisting of polyethylene glycol-water mixtures, sulfolane, n-methyl pyrrolidone, n-formylmorpholine, dimethyl sulfoxide, and tetraethylene glycol.

5. The method of claim 1 in which said organic material is a phenol and said organic extractant is selected from the group consisting of isopropylether, tricresylphosphate, methylisobutyl ketone, butylacetate and methylene chloride.

6. The method of claim 1 in which said organic material is caprolactam and said organic extractant is selected from the group consisting of chloroform, toluene, benzene, tetrachloroethane, alkyl phenols, methylcyclohexane, dichloroethane, trichloroethylene, and nitrobenzene.

7. The method of claim 1 in which said organic material is acetic acid and said organic extractant is selected from the group consisting of tributyl phosphate, tetriary amines, and trioctyl phosphine oxide.

8. The method of claim 1 in which said organic material is penicillin and said organic extractant is selected from the group consisting of methylcyclohexanone, dimethyl cyclohexanone, amylacetate, and chloroform.

9. The method of claim 1 in which said organic material is caffeine and said organic extractant is trichloroethylene.

10. The membrane of claim 1 in which at least one of said membranes has a pore diameter of between about 0.005 microns and 1 micron.

11. The method of claim 1 further including applying a higher liquid pressure on the first side of said first membrane.

12. The method of claim 1 further including supplying a higher liquid pressure on the side of said second membrane in contact with said stripping solution.

* * * * *